United States Patent [19]

Joseph et al.

[11] Patent Number: 4,572,417

[45] Date of Patent: Feb. 25, 1986

[54] WEB TRACKING APPARATUS

[75] Inventors: Brian J. Joseph; Stephen C. Rumsey, both of Rochester, N.Y.

[73] Assignee: Eastman Kodak Company, Rochester, N.Y.

[21] Appl. No.: 597,800

[22] Filed: Apr. 6, 1984

[51] Int. Cl.[4] .................... B65G 39/16; B65H 23/038; B65H 23/26

[52] U.S. Cl. ...................................... 226/20; 198/807; 226/21; 226/45

[58] Field of Search ....................... 226/18, 19, 20, 21, 226/22, 23, 3, 16, 45; 198/806, 807; 474/102, 103, 104, 105, 106, 107, 108; 318/596, 611, 619, 624; 355/88, 16

[56] References Cited

U.S. PATENT DOCUMENTS

| | | | |
|---|---|---|---|
| Re. 27,313 | 3/1972 | Jones et al. . | |
| 2,722,415 | 11/1955 | Wood, Jr. | 226/23 X |
| 2,960,629 | 11/1960 | Oldenburger | 318/611 X |
| 3,188,063 | 6/1965 | Costakis . | |
| 3,232,547 | 2/1966 | Thiede . | |
| 3,232,547 | 2/1966 | Thiede . | |
| 3,323,699 | 6/1967 | Bricker, Jr. | 226/21 X |
| 3,343,737 | 9/1967 | Alexeff et al. | 226/21 |
| 3,380,637 | 4/1968 | Knapp | 226/21 X |
| 3,406,320 | 10/1968 | Hemker | 318/626 X |
| 3,452,908 | 1/1969 | Hindle et al. | 226/21 |
| 3,518,739 | 7/1970 | Butler . | |
| 3,540,571 | 11/1970 | Morse et al. . | |
| 3,592,071 | 7/1971 | Steinke . | |
| 3,606,119 | 9/1971 | Callan . | |
| 3,606,119 | 9/1971 | Callahan . | |
| 3,693,781 | 9/1972 | Homeier | 226/23 X |
| 3,702,131 | 11/1972 | Stokes et al. . | |
| 3,820,888 | 5/1974 | Jordon | 355/3 R |
| 3,906,196 | 9/1975 | Spitz | 318/619 X |
| 3,913,813 | 10/1975 | Morse | 226/21 |
| 3,913,813 | 10/1975 | Morse . | |
| 3,974,952 | 8/1976 | Swanke et al. | 226/189 |
| 4,027,966 | 6/1977 | Jordan | 355/16 |
| 4,061,222 | 12/1977 | Rushing | 198/807 |
| 4,079,834 | 3/1978 | Fletcher, Jr. et al. | 198/810 |
| 4,173,904 | 11/1979 | Repetto | 226/21 X |
| 4,209,118 | 6/1980 | Minton | 226/21 |
| 4,331,274 | 5/1982 | Halewijn . | |
| 4,331,274 | 5/1982 | Halewijn . | |

FOREIGN PATENT DOCUMENTS

| | | |
|---|---|---|
| 2310949 | 10/1976 | France . |
| 2310949 | 10/1976 | France . |

*Primary Examiner*—Harvey C. Hornsby
*Assistant Examiner*—Scott J. Haughland
*Attorney, Agent, or Firm*—Larry P. Kessler

[57] ABSTRACT

Apparatus for controlling the alignment, in a lateral (cross-track) direction, of a web moving along a path to minimize lateral deviation between successive discrete areas of such web. The apparatus includes a steering roller for supporting the web for movement along such path. The steering roller is rotatable about an axis perpendicular to the plane of the span of the web approaching the steering roller. As the web moves along the path, the lateral position of a marginal edge of the web relative to a reference plane is sensed. When such lateral edge position is at either of two spaced predetermined locations relative to such reference plane, signals indicative of the presence of such edge at such locations are produced. The steering roller, in response to such signals, is rotated about the axis perpendicular to the plane of the span of the web approaching the steering roller to steer the web and thereby cause the lateral position of the edge of the web to progress from the predetermined location at which the edge was sensed to the other predetermined location as the web moves along its path.

7 Claims, 6 Drawing Figures

WEB TRACKING APPARATUS

BACKGROUND OF THE INVENTION

This invention relates generally to a web tracking apparatus, and more particularly to apparatus for controlling the alignment, in a lateral (cross-track) direction, of a web moving along a path.

In high speed electrographic reproduction apparatus for example, it is a common practice to employ an elongated dielectric belt or web adapted to carry transferable images and moving in a path in operative relation with electrographic process stations. Typically the web is supported by, and driven about, at least one roller. With a roller support, there is a tendency for the moving web to shift laterally with respect to such roller. Various apparatus for correcting for such lateral (cross-track) shifting of roller-supported webs are known, such as crowned rollers, flanged rollers, servo actuated steering rollers, or self-activated steering rollers for example. However, crowned rollers are not suitable for use with a web in an electrographic reproduction apparatus because they force the web toward the apex of such rollers and cause distortion of the web and produce local stresses in the web at the crown which can damage the web. Flanged rollers are also not suitable because they produce a concentrated loading at the edges of the web resulting in edge buckling, seam splitting, or excessive edge wear.

Electrographic reproduction apparatus therefore typically utilize servo actuated or self-activated steering rollers. While such steering rollers will correct for cross-track shifting of the web, they tend to produce significant back-and-forth lateral movement of the web as it is realigned. In making monochromatic reproductions the lateral movement, within limits of course, is not critical since only one discrete area of the web is used in generating any one reproduction. However, when either composite monochromatic or multi-color reproductions are being made, the degree of lateral movement becomes a significant limiting factor in obtaining quality output from the reproduction apparatus.

For example, in making multi-color reproductions with an apparatus utilizing a moving dielectric web, charge patterns corresponding to related color separation images of input information are formed in successive discrete areas of the web. Such patterns are developed with appropriate pigmented marking particles to form transferable images which are transferred sequentially to a receiver member to form the multicolor reproduction. The sequential image transfer must take place in accurate superimposed register in order to obtain quality output (i.e., faithful multi-color reproduction). Therefore, lateral movement of the web must be minimized so that lateral deviation between successive discrete areas is within acceptable limits whereby transferable images formed at such successive discrete areas are alignable in accurate superimposed register at transfer. Known servo actuated or self-activated steering rollers react to the absolute lateral position of the edge of the web and, since such edge may not be true, can cause formation of sequential transferable images on discrete areas outside the acceptable limits which allow accurate superimposed register at transfer.

SUMMARY OF THE INVENTION

This invention is directed to apparatus for controlling the alignment, in a lateral (cross-track) direction, of a web moving along a path to minimize lateral deviation between successive discrete areas of such web. The apparatus includes a steering roller for supporting the web for movement along such path. The steering roller is rotatable about an axis perpendicular to the plane of the span of the web approaching the steering roller. As the web moves along the path, the lateral position of a marginal edge of the web relative to a reference plane is sensed. When such lateral edge position is at either of two spaced predetermined locations relative to such reference plane, signals indicative of the presence of such edge at such locations are produced. The steering roller, in response to such signals, is rotated about the axis perpendicular to the plane of the span of the web approaching the steering roller to steer the web and thereby cause the lateral position of the edge of the web to progress from the predetermined location at which the edge was sensed to the other predetermined location as the web moves along its path.

The invention, and its objects and advantages, will become more apparent in the detailed description of the preferred embodiment presented below.

BRIEF DESCRIPTION OF THE DRAWINGS

In the detailed description of the preferred embodiment of the invention, reference is made to the accompanying drawings, in which.

DESCRIPTION OF THE PREFERRED EMBODIMENT

Figure 1:
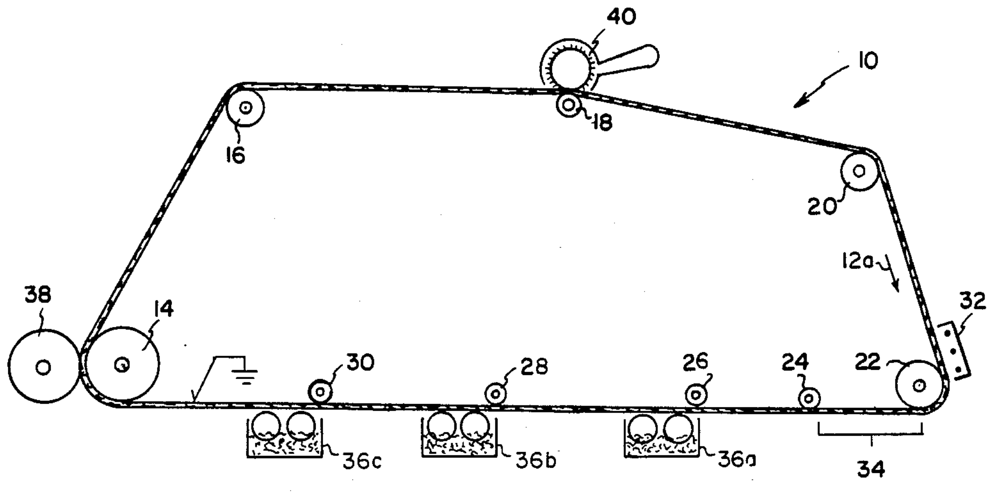
FIG. 1 is a schematic illustration, in cross-section, of an electrographic reproduction apparatus of the electrophotographic type having a dielectric photoconductive web moving along a path and including a web tracking apparatus according to this invention.

Referring now to the accompanying drawings, a reproduction apparatus 10 of the electrophotographic type employing a dielectric photoconductive web 12 adapted to carry transferable images, and including a web tracking apparatus according to this invention, is schematically illustrated in FIG. 1. The web 12 is, for example, of the type described in U.S. Pat. No. 3,615,414, issued Oct. 26, 1971, in the name of Light, and includes a photoconductive layer. The web 12, shown as being an endless belt, is supported by rollers 14, 16, 18, 20, 22, 24, 26, 28 and 30 for movement along a closed loop path. The path is associated with typical electrographic process stations such as primary charging station 32, exposure station 34, development stations 36*a*, 36*b*, 36*c*, transfer station 38, and cleaning station 40. Of course the web tracking apparatus of this invention is suitable for use with other roller-supported web configurations (e.g., one roller between web supply and take-up spools) where precise lateral web-position control is needed.

In the operation of apparatus 10 according to a typical monochrome or multicolor electrophotographic process, the web 12 (which is electrically grounded) is moved in the direction of arrow 12*a* about its closed loop path, and a uniform electrostatic charge is placed on the web as it passes the primary charging station 32. Discrete areas of the charged web are then exposed in exposure station 34 to an image (e.g., reflected light image) of input information to be reproduced to alter the uniform charge and form a charge pattern corresponding to such image. In making multicolor reproductions, by the subtraction color process for example, a reflected light image of the input information is divided into primary color separation images which expose successive discrete areas of the web to form corresponding charge patterns respectively. The charge patterns are respectively developed with pigmented marking particles complementary to the primary colors by developing stations 36*a*, 36*b*, and 36*c* to form transferable images. The images are then transferred seriatim from the discrete areas of the web to a receiver member (not shown) in the transfer station 38, and any residual marking particles remaining on that area of the web are cleaned in cleaning station 40 prior to the reuse of that area.

To obtain a faithful multicolor reproduction, the transferable images must be transferred to the receiver member in accurate superimposed register. Accordingly angular and lateral (cross-track) movement of the web as it travels about the closed loop path between the exposure and transfer stations must be controlled to minimize angular and lateral deviation between successive transferable images in the discrete areas of the web. Such control is accomplished by the web tracking apparatus, according to this invention, described hereinbelow.

Figure 2:
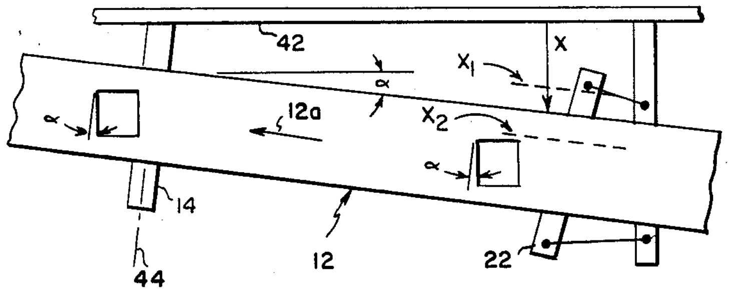
FIG. 2 is a diagramatic illustration representing the movement of the web of FIG. 1, layed out in planar form, as it travels about a portion of its path.

In such web tracking apparatus, the roller 14, about which the web travels in relation to transfer station 38, has an axis of rotation which is spatially fixed relative to the machine frame of the reproduction apparatus 10. As seen in FIG. 2, the diagrammatically represented machine frame is designated by numeral 42 and the rotational axis of roller 14 is designated by numeral 44. The web 12, traveling in direction of arrow 12*a*, approaches and leaves the roller 14 perpendicular to the axis 44 in the absence of external forces. Upstream of the roller 14, the web is supported by the steering roller 22 and is wrapped around a portion of the circumference of the steering roller to define a span 12i approaching the steering roller and a span 12ii leaving the steering roller (see FIG. 3). The wrap angle (included angle between plane of span 12i and plane of span 12ii) need only be of a magnitude sufficient to provide frictional drive of the roller 22 by the web 12. The lateral position of the web 12 approaching the roller 14 is controlled by the steering roller 22. Such lateral position is defined in terms of the distance, taken at a preselected location between rollers 14 and 22, of a marginal edge of the web in span 12ii from the plane of the machine frame 42 (designated by letter X in FIG. 2).

Figure 3:
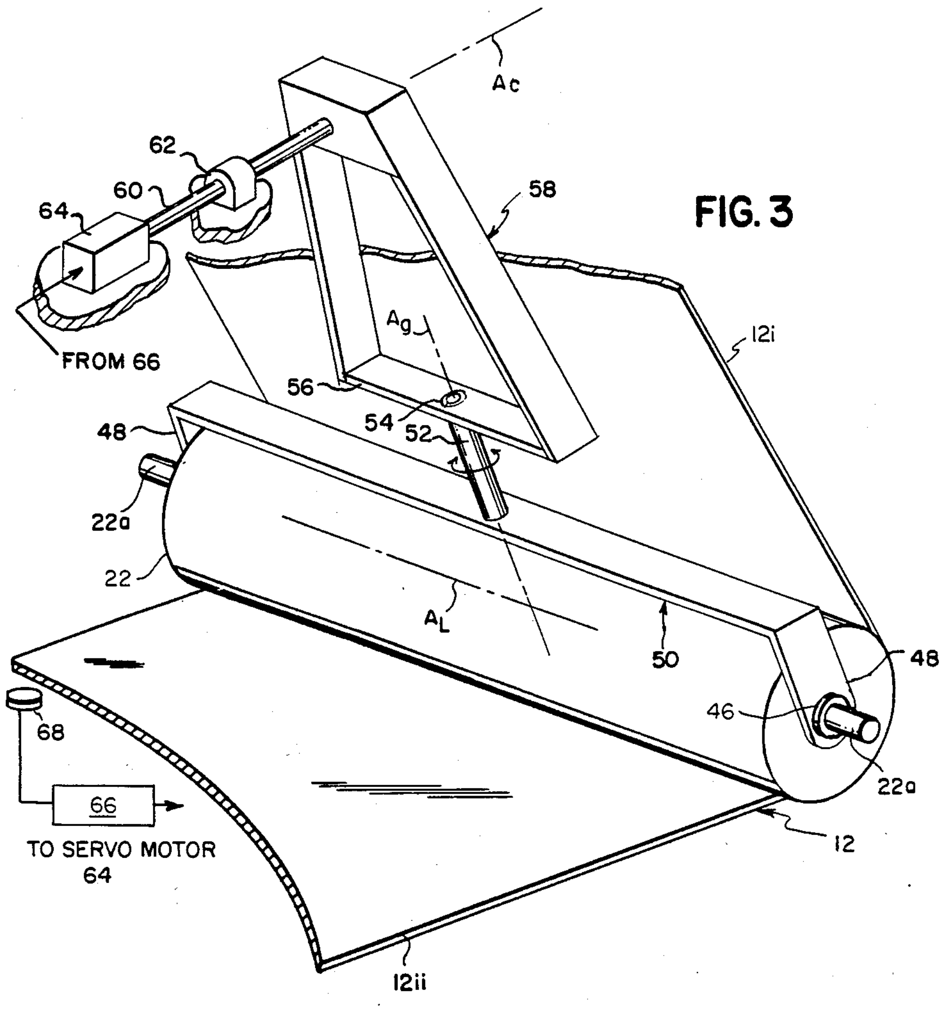
FIG. 3 is a view, in perspective and on an enlarged scale, of a portion of the web tracking apparatus according to this invention particularly showing the steering roller, its support, and the servo motor associated therewith, with portions removed or broken away to facilitate viewing.

The steering roller 22 includes stub shafts 22*a* extending from the roller coincident with the longitudinal axis $A_L$ of such roller (see FIG. 3). The stub shafts 22*a* are rotatably supported in bearings 46 mounted in the arms 48 of a generally U-shaped roller carriage 50 so that roller 22 freely rotates about its axis $A_L$. A shaft 52 is fixed to and extends from the carriage 50. The longitudinal axis $A_g$ of the shaft 52 is perpendicular to the axis $A_L$ and intercepts such axis at its mid-point, between the ends of roller 22. Further, axis $A_g$ is parallel to the plane of the span 12i of the web 12 approaching the steering roller 22 to define a gimbal axis for the steering roller.

The shaft 52 is rotatably supported in bearing 54 mounted in a caster subframe 56. The caster subframe 56 is supported, in turn, by a yoke 58 mounted on a shaft 60 for rotation therewith. The shaft 60 is rotatably supported in a bearing block 62 fixed to a portion of the frame of apparatus 10. A typical D.C. servo motor 64 (i.e., a motor in which the angular velocity of the motor output shaft is directly proportional to the electrical potential applied to the motor) is coupled to the shaft 60. The output shaft of the servo motor 64 selectively rotates the shaft 60 in either direction about its longitudinal axis $A_c$. The longitudinal axis $A_c$ of the shaft 60 defines a caster axis about which the steering roller 22 is rotatable, such caster axis being perpendicular to the plane of the span 12i of web 12. Thus, the steering roller 22 of this illustrative embodiment is both gimballed and castered. Of course, other arrangements for gimballing or castering the steering roller 22 are suitable for use with this invention. Moreover, in accordance with this invention, in certain other roller supported web configurations where precise lateral web position control is needed, the steering roller may be mounted for castered movement only.

The steering roller 22, in controlling the lateral position of the web 12 as will be described, corrects for long term lateral movements of a marginal edge of the web in span 12ii relative to the machine frame 42 without attempting to follow short term lateral movements. That is, the roller 22 steers the web so that it progresses laterally back-and-forth between predetermined allowable marginal edge position limits $X_1$ and $X_2$ (see FIG. 2). Within limits $X_1$ and $X_2$, transferable images are formable on successive discrete areas of the web in a range acceptable for accurate superimposed transfer of such images to a receiver member to form a faithful multicolor reproduction. On the other hand, the roller 22 does not attempt to follow the short term lateral movements of the web which may, in part, be related to the fact that the marginal edge of the web is not true (straight). Any attempt to follow such short term lateral movements would require a complicated control arrangement for the steering roller. Further, it would result in potentially unacceptable lateral image shifts since the placement of images on the web would be based on the location of the edge of the web at some time relative to when the respective images are placed on the web, rather than on placement of the images on the web at given locations relative to one another.

Figure 4:
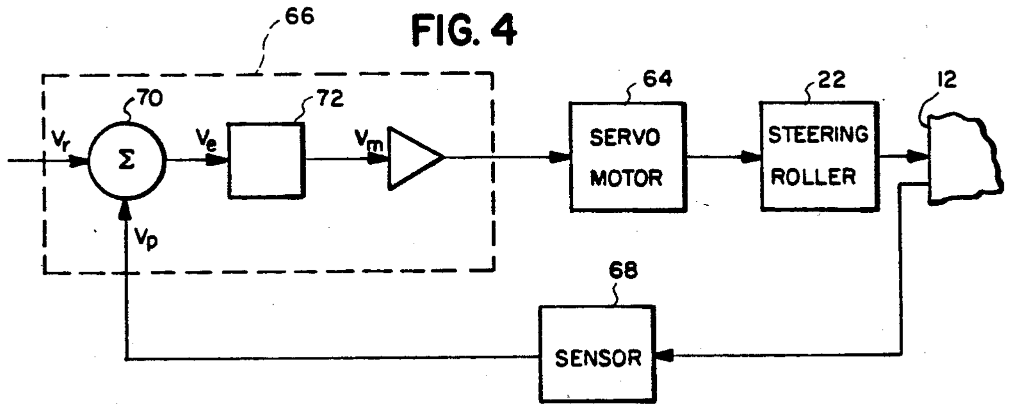
FIG. 4 is a block diagram of the servo motor control circuit for the steering roller of FIG. 3.

Correction of the long term lateral web movement is controlled by a negative feed-back control circuit 66 shown in FIG. 4. The circuit 66 is operatively coupled to a sensor 68 located adjacent to a marginal edge of the web 12 in span 12ii (see FIG. 3). The sensor 68 detects the lateral position X of the marginal edge of web 12 and generates a signal $V_p$ indicative thereof. For example, the sensor 68 may be a photoemitter/photodetector pair having a signal value (electrical potential level output) proportional to the area of the sensor covered by the web. The sensor signal $V_p$ is applied to a summing device 70 where it is compared to a reference signal $V_r$ to produce a signal $V_e$ of a value which is proportional to the lateral position of the edge of the web 12 in span 12ii relative to the plane of the machine frame 42. The reference signal $V_r$ is a preselected input electrical potential level. The value, of signal $V_r$ may be, for example, zero in which case the value of signal $V_e$ is directly proportional to the web edge position relative to the machine frame; or $V_r$ may be of any other desired value in which case the value of the signal $V_e$ is biased to be directly proportional to the web edge position relative to some other reference plane spaced from the machine frame (e.g. ideal location of edge of web from the machine frame). The signal $V_e$ is then applied to a non-linear amplifier 72 where a servo motor control signal $V_m$ may be produced.

Figure 5:
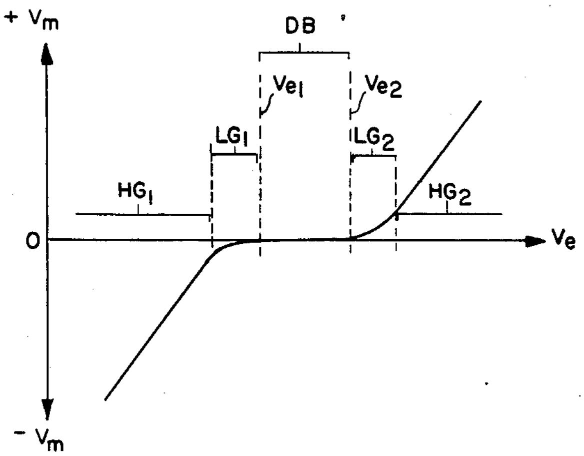
FIG. 5 is a graphical representation of the characteristic of operation of the non-linear amplifier of the control circuit of FIG. 4 plotted as the servo motor control signal ($V_m$) vs. the proportional lateral web edge position signal ($V_e$)

The operational characteristic of the non-linear amplifier 72 in producing the servo motor control signal $V_m$ is graphically shown in FIG. 5. Such characteristic includes a deadband range DB between signal values $V_{e1}$ and $V_{e2}$, low signal gain ranges $LG_1$ and $LG_2$ respectively below and above the deadband range, and high signal gain ranges $HG_1$ and $HG_2$ respectively below and above the low gain ranges. The signal values $V_{e1}$ and $V_{e2}$ correspond respectively to a lateral position of the edge of the web 12 at the maximum allowable web edge lateral position limits $X_1$ and $X_2$. Therefore, any lateral web edge position signal $V_e$ of a value between $V_{e1}$ and $V_{e2}$ corresponds to a lateral web edge position between, but not including, limits $X_1$ and $X_2$. When the value of signal $V_e$ is in this deadband range, a signal $V_m$ is produced of a value to which the servo motor is nonresponsive (e.g., electrical potential level is zero).

Similarly, any value of signal $V_e$ in the low signal gain ranges $LG_1$ and $LG_2$ corresponds to a lateral position of the edge of the web at (or slightly beyond) limits $X_1$ or $X_2$ respectively. When the value of signal $V_e$ is in these low signal gain ranges, an appropriate control signal $V_m$ of corresponding low value is produced to which the servo motor is responsive. Such signal $V_m$ is amplified and transmitted to the servo motor 64 to actuate the motor and proportionally rotate the shaft 60 in the appropriate direction. Such shaft rotation rotates the steering roller 22 about its caster axis $A_c$ which, in turn, causes the edge of the web to move laterally away from the reached limit position slowly toward the opposite limit position. As the web moves laterally, the value of signal $V_e$ correspondingly returns to the deadband range DB with the signal $V_m$ being correspondingly reduced until such signal reaches zero. As the signal $V_m$ is reduced, the rotation of the servo motor is correspondingly reduced bringing the steering roller to an adjusted position. The steering roller then remains in the adjusted position to steer the web 12 so that the edge of the web progresses from the reached lateral limit position to the opposite lateral limit position without attempting to follow any short term lateral web movement. Thereafter, when such opposite limit lateral position is reached a control signal $V_m$ (of opposite direction) is produced to which the servo motor is responsive to rotate the steering roller in the opposite direction about the caster axis causing the web to move laterally back toward the opposite limit position.

A value of signal $V_e$ in the high signal gain ranges $HG_1$ and $HG_2$ correspond to a lateral position of the edge of the web where it substantially exceeds limits $X_1$ or $X_2$ respectively, such as might occur when the web 12 is first mounted on its roller supports. When the value of signal $V_e$ is in these ranges, an appropriate control signal $V_m$ of corresponding high value is produced to which the servo motor is responsive. Such signal is amplified and transmitted to the servo motor 64 to actuate the motor and proportionally rotate the shaft 60 in the appropriate direction to rotate the steering roller 22 significantly about its caster axis $A_c$. The steering roller is thus adjustably positioned to cause the web edge to rapidly move laterally from the exceeded limit position toward the opposite limit position. As with the instance described above, the steering roller remains in its adjusted position until the opposite limit position is reached by the web edge, at which time the steering roller is rotated to cause the web to laterally move back toward the opposite limit position. In this manner normal tracking is quickly achieved. The selection of values for the signal gains in ranges $LG_1$, $LG_2$, $HG_1$ and $HG_2$ to produce the appropriate values of signal $V_m$ is dependent upon particular web and web tracking apparatus geometry. This disclosure is written so that one of ordinary skill in control system design will select such values using conventional web transport stability analysis techniques.

Figure 6:
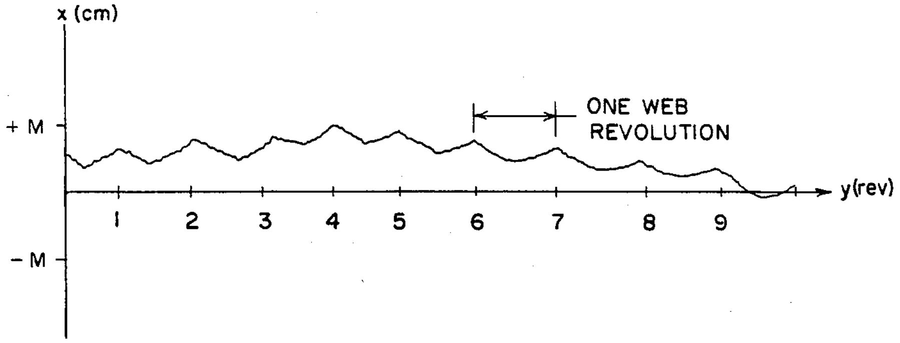
FIG. 6 is a graphical representation of the lateral movement of the edge of the web plotted as the lateral web edge position (X) vs. the distance of movement of the web along its path (Y).

As shown in the graph of FIG. 6, the maximum allowable lateral movement of the edge of web 12 for the illustrative apparatus 10 of FIG. 1 is for example a value $\pm$M (in centimeters) from a preselected reference location (or neutral position). Such maximum lateral movement corresponds to maximum allowable deviations between transferable images so that, on transfer, the images are in accurate superimposed registration to yield faithful multicolor reproductions. The deadband range of the non-linear amplifier 72 of circuit 66 is accordingly set to equate to signal values corresponding to lateral edge movement of $2\times$M. Therefore, even though the position at the edge of the web 12 may shift laterally as much as $\frac{1}{3}\times$M for example during any one complete revolution of the web about the closed loop path, such shift is ignored until the maximum allowable limit of lateral edge shift is reached (at completion of cycle 4 in FIG. 6). When the maximum allowable shift is reached, a signal $V_m$ is produced by the circuit 66 in the manner described above to actuate the servo motor 64 to reposition the steering roller and cause the overall direction of the lateral movement of the edge of the web to progress away from such maximum limit position toward the opposite maximum limit position. Such action is repeated when the opposite maximum limit position is reached (not shown in FIG. 6) with the result that the web alternately slowly progresses laterally between the maximum lateral limit positions.

With the lateral position of the edge of the web 12 controlled by the steering roller 22, the span 12ii of the web between the steering roller and roller 14 is precisely located; i.e. its angular ($\alpha$) and lateral (X) positions are known. The roller 24 adjacent to the exposure station 34 and the developer station backup rollers 26, 28 and 30 are castered and have only a small wrap angle respectively with the web. Therefore, they apply no lateral disturbance or constraint to the web. Thus, adjacent discrete areas of the web 12 will have a minumum of lateral movement on travel of the web between roller 22 and roller 14. For example, in the illustrated apparatus 10, lateral movement of the web edge measured at a similar time in each cycle of the web is approximately $1/30 \times M$ (see graph of FIG. 6); and if the web has a length to accommodate a given number N discrete image-receiving areas, the lateral shift between adjacent areas would be at most $1/N \times 1/30 \times M$. Such lateral shift is thus a very small fraction of the maximum allowable lateral movement. Accordingly transfer of the transferable images, formed on adjacent discrete areas of the web, to a receiver sheet in the transfer station 38 occurs in the required accurate superimposed register to form a faithful multicolor reproduction. It should also be noted that the precise location of the web 12 in the span 12ii between rollers 22 and 14 assures that all related transferable images have substantially the same angular relationship ($\alpha$) to the web and are thus transferred from the web to receiver member with the same angle to prevent any angular misalignment between the images at transfer.

For the remaining portion of the closed loop path of the web downstream of roller 14 to steering roller 22, roller 16 is castered and gimballed and roller 20 is gimballed so that the web is constrained according to the principles discussed in U.S. Pat. No. 3,913,813 (issued Oct. 21, 1975 in the name of Morse) to approach roller 22 as shown in FIG. 2. The roller 18, assisting the action of the cleaning station 40, is fixed for rotation about its longitudinal axis. However, this roller is formed with a substantially frictionless surface, such as Teflon for example, and has only a small wrap angle with the web so as to minimize any lateral disturbance or constraint on the web.

The invention has been described in detail with particular reference to a preferred embodiment thereof, but it will be understood that variations and modifications can be effected within the spirit and scope of the invention.

We claim:

1. Apparatus for controlling alignment, in a lateral direction, of a web moving along a path, said apparatus comprising:

at least one roller for supporting said web for movement along such path, said roller being a web steering roller mounted for rotation about an axis perpendicular to the plane of the span of said web approaching said steering roller;

means for sensing the lateral position of an edge of said web relative to a reference plane, as said web moves along such path, said sensing means producing a first signal proportional to the lateral position of said edge at or beyond a first predetermined location spaced from such reference plane and producing a second signal proportional to the lateral position of said edge at or beyond a second predetermined location spaced from such reference plane and from said first location; and means for rotating said steering roller about said axis in either of two opposite directions, said rotating means being responsive to said first signal to rotate said steering roller in one direction an amount proportional to said first signal to steer said web for moving said edge toward said second location, and responsive to said second signal to rotate said steering roller in the other direction an amount proportional to said second signal to steer said web for moving said edge toward said first location, whereby said edge progresses laterally substantially between said first and second locations as said web moves along such path.

2. The invention of claim 1 wherein said rotating means includes a reversible servo motor having an output shaft coupled to said steering roller, said servo motor being responsive to said first signal to rotate said output shaft in one direction and responsive to said second signal to rotate said output shaft in an opposite direction.

3. The invention of claim 2 wherein said servo motor output shaft is coincident with said rotational axis of said steering roller.

4. The invention of claim 1 wherein said sensing means includes (i) a sensor operatively associated with said web for detecting the lateral position of a marginal edge thereof and producing a signal corresponding to such lateral position, and (ii) circuit means responsive to said lateral position signal for producing said first or second signal when said lateral position signal reaches predetermined values corresponding to said predetermined locations respectively.

5. The invention of claim 4 wherein said circuit means includes a non-linear amplifier receiving said lateral position signal and having an operational characteristic on such signal to produce (i) a signal in a deadband range to which said rotating means is non-responsive when said lateral position signal corresponds to lateral position signals between said predetermined values, (ii) said first or second signal in low gain ranges when said lateral position signal corresponds to lateral position signals substantially at said predetermined values respectively, to provide appropriate rotation of said steering roller by said rotating means, and (iii) said first or second signal in high gain ranges when said lateral position signal corresponds to lateral position signals significantly exceeding said predetermined values respectively to provide appropriate significant rotation of said steering roller by said rotating means.

6. In an electrographic reproduction apparatus having a dielectric web providing successive discrete image receiving areas, and a plurality of web supporting rollers for moving such web along a path in which such image receiving areas are brought into operative relation with electrographic process stations to form related transferable images in such areas respectively and to transfer such images to a receiver member to form a composite reproduction, one of said web supporting rollers being a steering roller mounted for rotation about a caster axis, an improved means for controlling lateral alignment of said web so that lateral deviation between successive areas of such web is minimized whereby transfer of such transferable images is accomplished in accurate superimposed register, said control means comprising:

means for sensing the lateral position of an edge of such moving web relative to a reference plane, and for producing a signal corresponding to the position of said edge from such reference plane;

means, responsive to such edge position signal, for producing (i) a first signal proportional to such edge position signal when such edge is at or beyond a first position relative to said reference plane, (ii) a second signal proportional to such edge position signal when such edge is at or beyond a second position relative to said reference plane, and (iii) a third signal when such edge position signal corresponds to a position of said edge between said first and second positions; and a reversible servo motor coupled to said steering roller, said servo motor being responsive to said first and second signals for rotating said steering roller an amount proportional to such signals about said caster axis in directions to respectively steer the web for lateral movement of said edge from one to the other of said first and second positions as the web moves along such path, and non-responsive to said third signal whereby steering of the web is not effected while said edge is between said first and second positions.

7. The invention of claim 6 wherein said edge position signal responsive means includes a non-linear amplifier receiving said edge position signal and having an operational characteristic on such signal whereby (i) said third signal is produced when said edge position signal is in a deadband range corresponding to edge position signals between said first and second positions, (ii) said first and second signals are produced in low gain ranges corresponding to edge position signals substantially at said predetermined edge position respectively to provide appropriate corresponding rotation of said steering roller by said servo motor, and (iii) said first and second signals are produced in high gain ranges corresponding to edge position signals significantly exceeding said predetermined edge positions respectively to provide appropriate significant rotation of said steering roller by said servo motor.

* * * * *